Patented June 8, 1937

2,083,308

UNITED STATES PATENT OFFICE 2,083,308

MONOAZO-DYESTUFFS AND THEIR MANUFACTURE

Emil Senn, Reihen, near Basel, Switzerland, assignor to the firm of J. R. Geigy A. G., Basel, Switzerland No Drawing. Application July 23, 1936, Serial No. 92,209. In Great Britain August 27, 1935

18 Claims. (Cl. 260—97)

This invention relates to the manufacture of new, valuable monoazo-dyestuffs insoluble in water, by coupling a diazo-compound free from groups lending solubility in water, such as carboxyl or sulphonic acid groups, with a mono-acyl-meta-phenylenediamine of the following general formula:

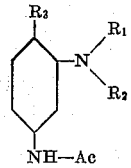

wherein: Ac means an acyl residue, for instance HCO—, $CH_3CO—$, $C_2H_5CO—$, $C_3H_7CO$, $C_{11}H_{23}CO—$, $C_2H_4OHCO$, $NH_2CH_2CO—$ (alkyl)$_2NCH_2CO—$; $R_1$ is a radical, such as methyl, ethyl, propyl, butyl, β-hydroxyethyl, β, γ-dihydroxypropyl, β-hydroxy-γ-alkoxy-propyl or the like; $R_2$ is a like radical to $R_1$ or hydrogen, $R_1$ and $R_2$ being the same or different radicals in the case of tertiary substituted nitrogen, and $R_3$ is a member selected from the group consisting of H, $CH_3$, $OCH_3$, $OC_2H_5$ and $OC_4H_9$.

Other substituents in the azo-component may be any desired, provided that they do not inhibit the coupling.

The new dyestuffs are in general of good solubility in alcohols, ketones, hydrocarbons, such as petroleum, paraffin oil, benzine, oils, waxes and the various modern solvents and their mixtures. It has been proved that it is possible to adapt the solubility to the various applications of the dyestuffs by suitable choice of the acid residue in the acylamino-group. The constitution of the acid residue in the acylamino-group has itself practically no effect on the shade; this is of great importance in the production of the new dyestuffs which can be adapted to various solvents and emulsifying agents, since the properties of solubility are dependent on the acyl-group and can be varied by variation of this group without affecting the shade.

Some of the new dyestuffs are characterized by good solubility in cellulose esters and ethers; they may either be dissolved in the corresponding lacquers or, after they have been finely dispersed by suitable additions, used for dyeing textiles, films, or moulded masses by the suspension method.

The new dyestuffs yield tints from yellow, red, violet, blue to green blue. Thus it is possible to produce bluish azo-dyestuffs, the blue tones of which have hitherto only been obtainable with coupling components of the amino-naphthalene and amino-naphthol series. The dyestuffs made with these last-named components are, however, practically useless in dyeing acetyl cellulose on account of their extremely unfavorable fastness to light. The new coupling components, therefore, satisfy a long felt want in the production of violet to blue acetyl cellulose dyestuffs fast to light.

Hitherto blue tints capable of being discharged and having good fastness have been obtained on acetate silk only by means of dyestuffs produced from the costly 1-diazo-6-halogen-2, 4-dinitrobenzenes, which produce blue dyestuffs with a small selection of coupling components of the benezene series, for instance alkyl-β-hydroxy-ethyl-cresidine. The discovery of the new azo-components affords the valuable possibility of producing new violet to blue dyestuffs from more simple and cheaper diazo-components, such as diazo-2, 4-dinitro- or diazo-2-chloro-4-nitrobenzene by coupling them with selected compounds of the new acyl-meta-phenylene-diamine series, which cheap components have been used hitherto only for producing red-violet to violet tints. A shifting of the color tint has not hitherto been known and must be accounted surprising. With the diazo-6-halogen-2, 4-dinitrobenzenes on the other hand there are obtained blue dyestuffs which far exceed in greenish shade the dyestuffs hitherto obtained with these diazo-components. In this respect also the discovery of the new azo-components must be acounted as an essential enrichment of the art.

The use of monoacyl-meta-phenylenediamine and its homologues or substitution products capable of coupling for the manufacture of yellow to orange dyestuffs for cellulose esters and ethers has been disclosed in the U. S. Specification No. 1,692,493. All these dyestuffs, however, have a free amino-group which can be diazotized and used for developing on the fibre. This constitutes a difference from the dyestuffs of the present invention which contain a secondary or tertiary amino-group in para-position to the azo-group. That by this substitution at this nitrogen-atom and further nuclear substitution the color tint of the monoazo-dyestuff produced should be so strongly shifted towards the blue end of the spectrum is new and surprising to the expert. Moreover, both the affinity and fastness to light of the new dyestuffs are considerably better than in the case of the known dyestuffs.

The following examples illustrate the invention, the parts being by weight.

Example 1

183 parts of 2,4-dinitraniline are diazotized in the usual manner with a nitrosyl-sulphuric acid, corresponding with 69 parts of nitrite. The diazonium solution is transferred to ice and coupled with an aqueous solution of 4-methoxy-3-(ethyl-$\beta$, $\gamma$-dihydroxypropyl)amino-acet-anilide. By buffering the strongly acid reaction the formation of dyestuff can be accelerated. It separates from the solution and after filtration is washed until neutral and dried. It is a dark powder of metallic lustre, soluble in alcohol freely to a blue solution. It dyes cellulose esters by the suspension method pure blue tints fast to light and capable of white discharge.

The new azo-component is obtained by ethylating 4-methoxy-3-mono-($\beta$, $\gamma$-dihydroxypropyl)amino-acet-anilide. It is very freely soluble in water and may be used as an aqueous solution for direct coupling. By methylating, the analogous methyl compound is obtained. Instead of the 4-methoxy-compound the analogous 4-methyl- or 4-n-butoxy-compound may also be employed.

If in this example the 2,4-dinitraniline is exchanged for 5- or 6-chloro-2,4-dinitraniline, dyestuffs are obtained which dye acetate artificial silk greenish-blue tints fast to light and discharging to pure white. If as diazo-component there is used 4-nitraniline, 5-nitro-2-anisidine, 2-chloro-4-nitraniline, or the like, a blue-red to violet dyestuff is obtained.

If in the above dyestuffs there is substituted for the acetyl residue the residue of formic acid, propionic acid, lactic acid, amino- or dialkyl-aminoacetic acid or the like, dyestuffs having analogous properties are obtained. It is the same, if the analogous $\beta$-hydroxy-$\gamma$-methoxypropyl-aminoacetanilide is used instead of the above named coupling compound.

Example 2

217.5 parts of 6-chloro-2,4-dinitraniline are diazotized in the usual manner by means of a nitrosyl-sulphuric acid, corresponding with 69 parts of nitrite, and the solution diluted when cold with three times its weight of glacial acetic acid. This solution is allowed to flow in a thin stream while stirring well, into an ice-cold hydrochloric acid solution of 376 parts of 4-methoxy-3-diethylamino-lauric acid-anilide. The formation of dyestuff can be accelerated by buffering the strongly mineral acid reaction. After disappearance of the acid reaction to congo the dyestuff separates in the form of a black precipitate which is isolated and dried in the known manner. It is then a dark powder which dissolves well in spirit and in nitrocellulose lacquers, but is particularly advantageously used for coloring petroleum and benzine, wherein the dyestuff is very freely soluble to a greenish-blue solution.

The analogous dyestuff from 2,4-dinitraniline as the diazo-component colors petroleum and benzine a reddish-blue.

The coupling component described above may be made as follows:

4-methoxy-3-nitro-acetanilide is reduced by the method of Béchamps, the amino-compound which is obtained in pure white crystals of melting point 109° C. is bisethylated with diethyl sulphate. The 4-methoxy-3-diethylamino-acetanilide forms white laminae melting at 104–105° C. The acetyl-compound is saponified in the usual manner and thereby the base is isolated. The latter is obtained in the form of a colorless oil of boiling point 157–159° C. at 12 mm. pressure. By reaction with lauric acid chloride the 4-methoxy-3-diethylamino-laurylanilide is obtained in the form of a white crystalline powder of melting point 76° C.

Instead of the diethyl-compound above named, there may be used other dialkylated compounds like the analogous dimethyl-, dipropyl-, dibutylamino-acetanilides.

Example 3

207 parts of 2,6-dichloro-4-nitraniline are diazotized in known manner with a nitrosyl-sulphuric acid, corresponding with 69 parts of sodium nitrite. The solution is transferred to ice and coupled with 246 parts of a solution, feebly acid to congo, of 3-diethyl-amino-laurylanilide. By buffering the strongly mineral acid reaction the dyestuff formation is hastened. The separated dyestuff is worked up in the usual manner and dried. It is a dark red powder which is excellently suited for coloring red, oils, fats, soaps, petroleum and benzine.

By exchanging 2,6-dichloro-4-nitraniline for meta-nitraniline, 2,4-dichloraniline and similar bodies in this example, yellow dyestuffs are obtained having similar properties. With 2,4-dinitraniline, 6-chloro-2,4-dinitraniline and the like dyestuffs are obtained which color spirit lacquers and cellulose ester lacquers, fats, oils, soaps, petroleum or the like red-violet to blue-violet tints.

The coupling component used in this example is made as usual from N-N-diethyl-meta-phenylene-diamine by acylating with lauric acid chloride. The 3-diethylamino-laurylanilide crystallizes from methyl alcohol in the form of white laminae of soapy feel which melt without decomposition at 76.5° C.

Example 4

183 parts of 2,4-dinitraniline are converted into the diazo-compound in the usual manner and coupled in a solution feebly acid to congo with 264 parts of 4-methoxy-3-diethylamino-lactic anilide. The precipitated dyestuff is isolated in the usual manner and dried. It is a dark powder, soluble in alcohol and ethyl acetate to a blue solution. It dyes acetate artificial silk by the suspension method pure blue tints of excellent fastness properties and capable of white discharge.

A dyestuff which dyes greenish blue and is also capable of white discharge is obtained by coupling diazo-6-chloro-2,4-dinitrobenzene with the above coupling component.

The latter is obtained by heating 4-methoxy-3-diethylamino-1-aminobenzene with lactic acid-ethylester in a closed vessel at 180° C. The base boils at 213.5 to 218.5° C. under 3.5 mm. pressure and is a pale yellow, highly viscous oil which solidifies slowly to a crystalline mass melting at 75–76° C.

Example 5

183 parts of 2,4-dinitraniline are diazotized in the usual manner and while ice-cold and acid to congo the solution is coupled with an aqueous solution of 269 parts of 4-methoxy-3-(bis-$\beta$-hydroxy-ethyl)-amino-acetanilide. The color base, isolated in the usual manner, is when dry a dark powder, soluble in alcohol and ethyl acetate to blue solutions and dyeing acetate artificial silk blue tints of good properties of fastness which may be discharged white.

If in this example there is used as the coupling component instead of the acetanilide the lactanilide, formanilide or normal butyranilide, there is obtained a dyestuff of similar properties.

These anilides are obtained by heating the corresponding 4 - alkoxy - 3 - amino-acylanilide with ethylene-chlorhydrin in presence of an agent that binds acid, such as calcined sodium carbonate or chalk. They are extremely soluble in water and are therefore further worked up in aqueous solution without further purification. If there are used 4-alkoxy-3-alkylamino-acylanilides, the analogous 4-alkoxy-3-N-β-hydroxyethyl-N-alkylamino-acylanilides are obtained.

The 4-alkoxy-3-amino-acylanilides are made, for example, by acylating para-amino-phenol-methyl ether or ethyl ether with normal butyric acid, acetic acid, lactic acid or formic acid or an ester or chloride thereof, nitrating the acyl-amino-compound and reducing the acyl-amino-nitro-compound thus formed.

*Example 6*

183 parts of 2,4-dinitraniline are diazotized in the usual manner and the ice-cold solution, acid to congo, is coupled with a solution of 254 parts of 4 - methoxy-3-mono-(β,γ-dihydroxypropyl)-amino-acetanilide. The formation of dyestuff is finished after a short time. The new dystuff is worked up in the usual manner and when dry is a dark powder of metallic lustre, soluble in alcohol, ethylacetate and like organic solvents to blue-violet solutions; it dyes acetate artificial silk by the suspension method blue-violet tints of good properties of fastness and capable of white discharge.

4-methoxy - 3 - mono-(β,γ - dihydroxypropyl)-amino-acetanilide is obtained by heating 4-methoxy-3-amino-acetanilide with glycerine-α-chlorhydrin. The new compound need not be isolated and purified but may be used in aqueous solution directly for the manufacture of dyestuffs.

Instead of the above named β,γ-dihydroxypropyl-amino-acetanilide there may be used the β-hydroxy-γ-meth- or ethoxypropyl-amino-acetanilide.

Similar dyestuffs are obtained by using, instead of the 4 - methoxy - 3 - mono-(β,γ - dihydroxypropyl) -aminoacetanilide named above, the corresponding formanilide, lactanilide, propionanilide, normal butyranilide, the 3-monomethylamino- or 3-dimethylamino-, the 3-monoethylamino- or 3-diethylaminoacetanilide or the corresponding 4-methoxy-, 4-ethoxy- or 4-butoxy-3-methyl- or ethylamino-acetanilides. Instead of the above named diazo-component, 5- or 6-chloro-2,4-dinitraniline may be used, in which case dyestuffs are obtained which dye cellulose esters reddish-blue tints.

*Example 7*

183 parts of 2,4-dinitraniline are diazotized in the usual manner with nitrosyl-sulphuric acid, and the diazonium solution is transferred to ice and filtered. 380 parts of 4-methoxy-3-diethyl-amino-1-lauryl-anilide are dissolved in water with the necessary quantity of hydrochloric acid to give a solution faintly acid to congo, and the diazonium solution is slowly added thereto at 0° C. The formation of dyestuff is completed by the gradual addition of sodium acetate until a feebly acid reaction to congo is obtained. The resulting dyestuff is filtered by suction, washed until neutral, and dried. It is obtained in the form of a violet-black mass having a metallic lustre, and dissolves with a pure blue color in alcohols, benzene, benzine, varnishes and lacquers having a cellulose ester base, and the like.

Instead of the above named 4-methoxy-3-diethylamino-1-laurylanilide there may also be used the 4-methoxy-3-dimethylamino-, 3-dipropyl-amino or 3-dibutyl-amino-1-laurylanilide.

What I claim is:—

1. A manufacture of water-insoluble monoazo-dyestuffs, consisting in coupling a diazo-compound free from groups lending solubility in water with a mono-acyl-meta-phenylene-diamine of the following general formula:

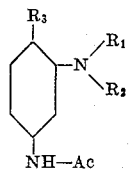

wherein Ac means an acyl radical selected from the group consisting of HCO—, CH$_3$CO—, C$_2$H$_5$CO—, C$_3$H$_7$CO—, C$_{11}$H$_{23}$CO—, C$_2$H$_4$OHCO—, NH$_2$CH$_2$CO—, (alkyl)$_2$NCH$_2$CO; R$_1$ represents a radical selected from the group consisting of methyl, ethyl, propyl, butyl,, β-hydroxyethyl, β, γ-dihydroxypropyl and β-hydroxy-γ-a l k o x y-propyl, R$_2$ represents a member of the group consisting of R$_1$ and hydrogen and R$_3$ represents a member selected from the group consisting of H, CH$_3$, OCH$_3$, OC$_2$H$_5$ and OC$_4$H$_9$.

2. A manufacture of water-insoluble monoazo-dyestuffs, consisting in coupling a diazo-compound free from groups lending solubility in water with a mono-acyl-meta-phenylenediamine of the following general formula:

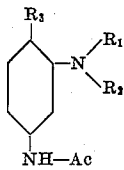

wherein Ac means an acyl radical selected from the group consisting of HCO—, CH$_3$CO—, C$_2$H$_5$CO—, C$_3$H$_7$CO, C$_{11}$H$_{23}$CO—, C$_2$H$_4$OHCO—, NH$_2$CH$_2$CO—, (alkyl)$_2$NCH$_2$CO; R$_1$ represents a radical selected from the group consisting of methyl, ethyl, propyl, butyl, β-hydroxyethyl, β,γ-dihydroxypropyl, and β-hydroxy-γ-alkoxy-propyl, R$_2$ represents a member of the group consisting of R$_1$ and hydrogen R$_1$ and R$_2$ being the same radicals in the case of tertiary substituted nitrogen, and R$_3$ represents a member selected from the group consisting of H, CH$_3$, OCH$_3$, OC$_2$H$_5$ and OC$_4$H$_9$.

3. A manufacture of water-insoluble monoazo-dyestuffs, consisting in coupling a diazo-compound free from groups lending solubility in water with a mono-acyl-meta-phenylenediamine of the following general formula:

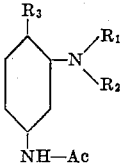

wherein Ac means an acyl radical selected from the group consisting of HCO—, CH$_3$CO—, C$_2$H$_5$CO—, C$_3$H$_7$CO, C$_{11}$H$_{23}$CO—, C$_2$H$_4$OHCO—, NH$_2$CH$_2$CO—, (alkyl)$_2$NCH$_2$CO—; R$_1$ represents a radical selected from the group consisting of methyl, ethyl, propyl, butyl, β-hydroxy-ethyl, β,γ-dihydroxypropyl and β-hydroxy-γ-alkoxypropyl, R₂ represents a member of the group consisting of R₁ and hydrogen R₁ and R₂ being different radicals in the case of tertiary substituted nitrogen, and R₃ represents a member selected from the group consisting of H, CH₃, OCH₃, OC₂H₅ and OC₄H₉.

4. A manufacture of water-insoluble monoazo-dyestuffs, consisting in coupling a nitrodiazo compound of the benzene series free from groups lending solubility in water with a mono-acyl-meta-phenylenediamine of the following general formula:

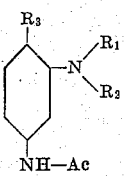

wherein Ac means an acyl radical selected from the group consisting of HCO—, CH₃CO—, C₂H₅CO—, C₃H₇CO—, C₁₁H₂₃CO—, C₂H₄OHCO—, NH₂CH₂CO—, (alkyl)₂NCH₂CO—; R₁ represents a radical selected from the group consisting of methyl, ethyl, propyl, butyl, β-hydroxyethyl, β,γ-dihydroxypropyl and β-hydroxy-γ-alkoxypropyl, R₂ represents a member of the group consisting of R₁ and hydrogen and R₃ represents a member selected from the group consisting of H, CH₃, OCH₃, OC₂H₅ and OC₄H₉.

5. A manufacture of water-insoluble monoazo-dyestuffs, consisting in coupling a dinitrodiazo compound of the benzene series free from groups lending solubility in water with a mono-acyl-meta-phenylenediamine of the following general formula:

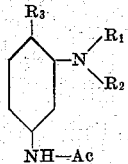

wherein Ac means an acyl radical selected from the group consisting of HCO—, CH₃CO—, C₂H₅CO—, C₃H₇CO—, C₁₁H₂₃CO, C₂H₄OHCO—, NH₂CH₂CO—, (alkyl)₂NCH₂CO—; R₁ represents a radical selected from the group consisting of methyl, ethyl, propyl, butyl, β-hydroxyethyl, β,γ-dihydroxypropyl and β-hydroxy-γ-alkoxypropyl, R₂ represents a member of the group consisting of R₁ and hydrogen and R₃ represents a member selected from the group consisting of H, CH₃, OCH₃, OC₂H₅ and OC₄H₉.

6. A manufacture of water-insoluble monoazo-dyestuffs, consisting in coupling a dinitrodiazo compound of the benzene series free from groups lending solubility in water with a mono-acyl-meta-phenylenediamine of the following formula:

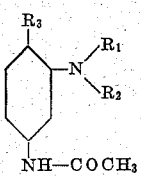

wherein R₁ represents a radical selected from the group consisting of methyl, ethyl, propyl, butyl, β-hydroxyethyl, β,γ-dihydroxypropyl and β-hydroxy-γ-alkoxypropyl, R₂ represents a member of the group consisting of R₁ and hydrogen and R₃ represents a member selected from the group consisting of H, CH₃, OCH₃, OC₂H₅ and OC₄H₉.

7. A manufacture of water-insoluble monoazo-dyestuffs, consisting in coupling a dinitrodiazo compound of the benzene series free from groups lending solubility in water with a mono-acyl-meta-phenylenediamine of the following formula:

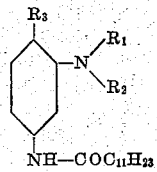

wherein R₁ represents a radical selected from the group consisting of methyl, ethyl, propyl, butyl, β-hydroxyethyl, β,γ-dihydroxypropyl and β-hydroxy-γ-alkoxypropyl, R₂ represents a member of the group consisting of R₁ and hydrogen and R₃ represents a member selected from the group consisting of H, CH₃, OCH₃, OC₂H₅ and OC₄H₉.

8. A manufacture of water-insoluble monoazo-dyestuffs, consisting in coupling 2,4-dinitraniline with an anilide of the following formula:

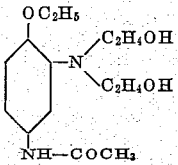

9. A manufacture of water-insoluble monoazo-dyestuffs, consisting in coupling 6-chloro-2,4-dinitraniline with an anilide of the following formula:

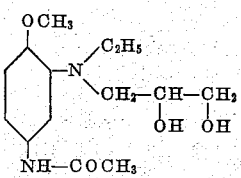

10. A manufacture of water-insoluble monoazo-dyestuffs, consisting in coupling 2,4-dinitraniline with an anilide of the following formula:

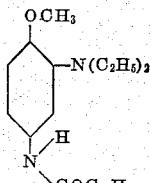

11. Water-insoluble monoazo-dyestuffs of the following general formula:

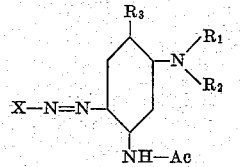

wherein Ac means an acyl radical selected from the group consisting of HCO—, CH₃CO—, C₂H₅CO—, C₃H₇CO—, C₁₁H₂₃CO—, C₂H₄OHCO—, NH₂CH₂CO—, (alkyl)₂NCH₂CO; R₁ represents a radical selected from the group consisting of methyl, ethyl, propyl, butyl, β-hydroxyethyl, β,γ-dihydroxypropyl and β-hydroxy-γ-alkoxypropyl, R₂ represents a member of the group consisting of R₁ and hydrogen and R₃ represents a member selected from the group consisting of H, CH₃, OCH₃ OC₂H₅ and OC₄H₉, X being the radical of a diazo compound free from groups lending solubility in water, said dyestuffs being in general of good solubility in alcohols, ketones, hydrocarbons, oils, waxes and so on, as well as some of them in cellulose esters and ethers and yielding tints from yellow, red, violet, blue to green blue of good fastness.

12. Water-insoluble monoazo-dyestuffs of the following general formula:

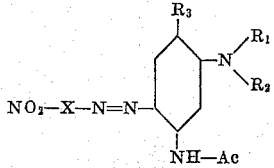

wherein Ac means an acyl radical selected from the group consisting of HCO—, CH₃CO—, C₂H₅CO—, C₃H₇CO—, C₁₁H₂₃CO—, C₂H₄OHCO—, NH₂CH₂CO—, (alkyl)₂NCH₂CO—; R₁ represents a radical selected from the group consisting of methyl, ethyl, propyl, butyl, β-hydroxyethyl, β,γ-dihydroxypropyl and β-hydroxy-γ-alkoxypropyl, R₂ represents a member of the group consisting of R₁ and hydrogen and R₃ represents a member selected from the group consisting of H, CH₃, OCH₃, OC₂H₅ and OC₄H₉, X being the radical of a nitro-diazo compound free from groups lending solubility in water, said dyestuffs being in general of good solubility in alcohols, ketones, hydrocarbons, oils, waxes and so on, as well as some of them in cellulose esters and ethers and yielding tints from yellow, red, violet, blue to green blue of good fastness.

13. Water-insoluble monoazo-dyestuffs of the following general formula:

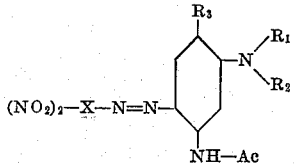

wherein Ac means an acyl radical selected from the group consisting of HCO—, CH₃CO—, C₂H₅CO—, C₃H₇CO—, C₁₁H₂₃CO—, C₂H₄OHCO—, NH₂CH₂CO—, (alkyl)₂NCH₂CO—; R₁ represents a radical selected from the group consisting of methyl, ethyl, propyl, butyl, β-hydroxyethyl, β,γ-dihydroxypropyl and β-hydroxy-γ-alkoxypropyl, R₂ represents a member of the group consisting of R₁ and hydrogen and R₃ represents a member selected from the group consisting of H, CH₃, OCH₃, OC₂H₅ and OC₄H₉, X being the radical of a dinitro-diazo compound free from groups lending solubility in water, said dyestuffs being in general of good solubility in alcohols, ketones, hydrocarbons, oils, waxes and so on, as well as some of them in cellulose esters and ethers and yielding tints from yellow, red, violet, blue to green-blue of good fastness.

14. Water-insoluble monoazo-dyestuffs of the following general formula:

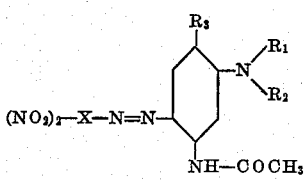

wherein R₁ represents a radical selected from the group consisting of methyl, ethyl, propyl, butyl, β-hydroxyethyl, β,γ-dihydroxypropyl and β-hydroxy-γ-alkoxypropyl, R₂ represents a member of the group consisting of R₁ and hydrogen and R₃ represents a member selected from the group consisting of H, CH₃, OCH₃, OC₂H₅ and OC₄H₉, X being the radical of a dinitro-diazo compound free from groups lending solubility in water, said dyestuffs being in general of good solubility in alcohols, ketones, hydrocarbons, oils, waxes and so on, as well as some of them in cellulose esters and ethers and yielding tints from violet, blue to green-blue of good fastness.

15. Water-insoluble monoazo-dyestuffs of the following general formula:

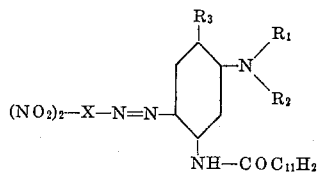

wherein R₁ represents a radical selected from the group consisting of methyl, ethyl, propyl, butyl, β-hydroxyethyl, β,γ-dihydroxypropyl and β-hydroxy-γ-alkoxypropyl, R₂ represents a member of the group consisting of R₁ and hydrogen and R₃ represents a member selected from the group consisting of H, CH₃, OCH₃, OC₂H₅ and OC₄H₉, X being the radical of a dinitro-diazo compound free from groups lending solubility in water, said dyestuffs being in general of good solubility in alcohols, ketones, hydrocarbons, oils, waxes and so on, as well as some of them in cellulose esters and ethers and yielding tints from violet, blue to green-blue of good fastness.

16. The water-insoluble monoazo-dyestuff of the following formula:

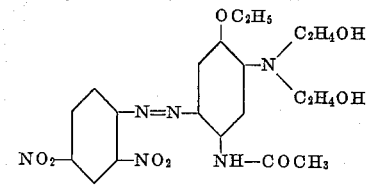

said dyestuff dyeing cellulose esters and ethers blue tints fast to light and capable of white discharge.

17. The water-insoluble monoazo-dyestuff of the following formula:

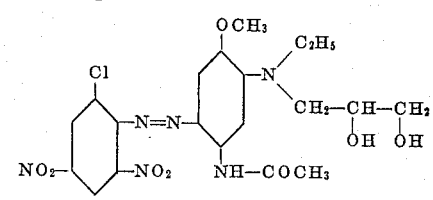

said dyestuff dyeing acetate silk greenish blue tints fast to light and capable of white discharge.

18. The water-insoluble monoazo-dyestuff of the following formula:

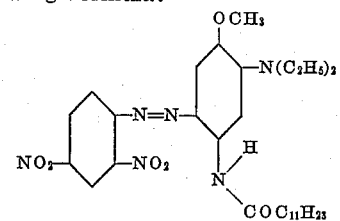

said dyestuff being freely soluble in alcohols, ketones, hydrocarbons, oils, waxes and the like with blue coloration.

EMIL SENN.